United States Patent [19]
Hughes et al.

[11] 3,869,334
[45] Mar. 4, 1975

[54] INSULATING MATERIALS

[75] Inventors: John Thomas Hughes, Mamble, near Kidderminster; Joseph Anthony MacWilliam, Kidderminster, both of England

[73] Assignee: Micropore Insulation Limited, Kidderminster, England

[22] Filed: Sept. 11, 1973

[21] Appl. No.: 396,295

Related U.S. Application Data

[62] Division of Ser. No. 151,970, June 10, 1971.

[52] U.S. Cl.................. 161/87, 161/89, 161/93, 161/158, 161/160, 161/193, 161/403, 252/62
[51] Int. Cl........................... B32b 5/16, B32b 5/22
[58] Field of Search............ 161/41, 45, 87, 88, 93, 161/158, 159, 160, 162, 193; 252/62, 317

[56] References Cited
UNITED STATES PATENTS

| | | | |
|---|---|---|---|
| 2,188,007 | 1/1940 | Kistler | 252/317 |
| 2,249,767 | 7/1941 | Kistler | 252/317 X |
| 3,427,189 | 2/1969 | Brechne | 161/93 X |

*Primary Examiner*—George F. Lesmes
*Assistant Examiner*—Alan F. McDonald
*Attorney, Agent, or Firm*—Holman & Stern

[57] ABSTRACT

A panel of thermal insulating material comprises a porous envelope of, for example, fibre glass cloth, containing a consolidated mass of dry particulate microporous insulating material.

3 Claims, No Drawings

INSULATING MATERIALS

This is a divisional of application Ser. No. 151,970, filed June 10, 1971.

BACKGROUND OF THE INVENTION

1. Field of the Invention

This invention relates to thermal insulating materials.

2. Description of the Prior Art

Panels of thermal insulation material are known which consist of kiesel guhr moulded to the required configuration. Microporous insulation materials are also known, these normally being used as a loose unconsolidated mass. Swiss Specification No. 8,204 discloses the manufacture of panels of insulation material from kiesel guhr and German Patent Specification No. 1,170,855 discloses the use of a loose consolidated mass of microporous silica aerogel as a thermal insulator.

SUMMARY OF THE INVENTION

A panel of thermal insulating material comprises a porous envelope containing a dry particulate insulating material, the particles of the insulating material being bonded to each other by having had pressure applied thereto.

DESCRIPTION OF A PREFERRED EMBODIMENT

In one example of the present invention a microporous thermal insulating material is prepared by admixing microporous silica aerogel and titanium oxide as an opacifier. The amount of opacifier is preferably about one tenth to twice the weight of the silica aerogel. A fibrous material can also be included in the mix, for example, if the insulating material is to be used at elevated temperatures, ceramic fibres can be used. For lower temperatures applications, other fibrous materials can be used. Other microporous particulate materials which can be used instead of silica aerogel include finely divided microporous metal oxides such as alumina, zirconia and titania of similar particle size and structure as silica aerogel.

When an intimate mixture of silica aerogel or other microporous particulate material, opacifier and optionally the ceramic or other fibres has been prepared, the insulating material is placed in a porous envelope in the form of a bag of fibre-glass cloth of low permeability.

To fill the bag with the insulating material, the bag is attached to a discharge nozzle at the end of a feed pipe for the insulating material. The bag is contained within a chamber connected to a suction device and the pressure within the chamber is reduced to obtain an induced feed of the insulating material into the bag. When sufficient insulating material has been fed into the bag, the application of suction is discontinued, the bag is removed from the discharge nozzle and the open mouth of the bag is closed as by sewing or by application of a resinous sealant.

The bag containing the insulating material is then placed on the bottom die of a press and the upper die of the press is then lowered whereby the bag of insulating material is formed into a semi-rigid panel. The two dies of the press are so formed as to permit the escape of air through the pores of the bag. There is a build-up of reaction forces within the microporous insulating material which creates a tension strain in the fibreglass. On application of the pressure to the bag of insulating material which causes air to escape from the bag through the pores of the fibre-glass cloth, the particles of microporous silica aerogel become bonded to each other and the fibre-glass bag, at least part of the bonding between the bag and the particles of silica aerogel resulting from penetration of the pores of the fibreglass bag by the silica aerogel particles. The silica aerogel particles thus become effectively mechanically interlocked with the material forming the envelope.

The tension strain created within the fibre-glass cloth remains after release of the applied pressure and this induced tension strain provides additional rigidity for the insulating panel structure.

If the fibre-glass cloth is composed of a smooth yarn, the yarn is preferably pre-treated by deposits thereon of a ceramic oxide or a chemical "starch" to increase the degree of bonding between the yarn and the insulating material.

Although the invention has been described above in relation to an envelope formed of fibre-glass cloth, the porous envelope can alternatively be formed of paper having the required permeability or of a synthetic plastics material, again having the required permeability.

The porous envelope can also be formed of cotton, the use of a cotton envelope resulting in a flexible structure which can be shaped to fit contoured surfaces.

One important application of a panel constructed in accordance with the present invention is in thermal storage heaters in which, because of the high insulating efficiency of the insulating panel, the thickness of the panel which is used can be substantially reduced as compared with previous insulating panels so that the size of the cabinet or like structure of the storage heater can be reduced giving a considerable saving in size and materials.

The particles of insulating material are preferably bonded to the envelope by penetration of the pores thereof and it is preferred that the envelope is in tension. The envelope does not need to be porous throughout the whole area thereof so long as provision is made for the escape of air or gas to allow compaction of the particulate material.

The preferred particulate material is microporous silica aerogel intimately mixed with an opacifier such as titanium dioxide, chromium oxide, zirconium oxide, iron oxide, manganese dioxide or carbon black.

Microporous silica aerogel is a gel in which the liquid phase has been replaced by a gaseous phase in such a way as to avoid the shrinkage which would occur if the gel had been dried directly from a liquid. A substantially identical structure can, however, be obtained by controlled precipitation from a silica solution, the temperature and p.H. being controlled during precipitation to obtain an open lattice precipitate.

The term microporous silica aerogel as used in this specification is to be deemed to include not only microporous silica aerogel as described above but also equivalent microporous open lattice silica structures, such as precipitated, pyrogenic or electro-thermal types in which the average ultimate particle size is less than 100 milli-micro-meters.

We claim:

1. A rigid thermal insulating panel consisting essentially of an envelope of glass fibre cloth containing a pressure-consolidated mass of microporous silica aerogel being bonded to said cloth by penetration of the microporous silica aerogel into the pores of said cloth from the application of said pressure and said cloth being in a state of tension.

2. A panel according to claim 1, wherein said microporous silica aerogel contains an opacifier selected from the group consisting of titanium dioxide, chromium oxide, zirconium oxide, iron oxide, manganese dioxide, and carbon black.

3. A panel according to claim 1, wherein said microporous silica aerogel contains ceramic fibres.

* * * * *